(12) United States Patent
Maker, III

(10) Patent No.: US 10,834,296 B2
(45) Date of Patent: Nov. 10, 2020

(54) DYNAMICALLY ADJUSTING VIDEO TO IMPROVE SYNCHRONIZATION WITH AUDIO

(71) Applicant: Roku, Inc., Los Gatos, CA (US)

(72) Inventor: Frank L. Maker, III, Livermore, CA (US)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 16/128,624

(22) Filed: Sep. 12, 2018

(65) Prior Publication Data
US 2020/0084342 A1    Mar. 12, 2020

(51) Int. Cl.
*H04N 5/04* (2006.01)
*G11B 20/10* (2006.01)
(Continued)

(52) U.S. Cl.
CPC ......... *H04N 5/04* (2013.01); *G11B 20/10527* (2013.01); *H04N 5/602* (2013.01);
(Continued)

(58) Field of Classification Search
CPC .................................................. H04N 21/4307
See application file for complete search history.

(56) References Cited

U.S. PATENT DOCUMENTS

2014/0043485 A1*  2/2014  Bateman .............. H04N 7/181
                                                        348/159
2015/0125013 A1*  5/2015  Secall ................... G10L 19/167
                                                        381/315
(Continued)

OTHER PUBLICATIONS

"Relative Timing of Sound and Vision for Broadcasting," Recommendation ITU-R BT.1359, 3 pages, 1998.
(Continued)

*Primary Examiner* — Paulos M Natnael
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for synchronizing playback of audio and video, wherein the audio is transmitted to wireless speakers over a wireless medium. Some embodiments operate by receiving content for playback from a source, wherein the content comprises the audio and the video; determining that synchronization of playback of the audio and video will not be acceptable, by analyzing the wireless medium to determine a probable transmission time it will take for the audio to be transmitted to the wireless speakers over the wireless medium; determining that a video buffer is not large enough to buffer the video long enough to compensate for the probable transmission time, based on at least a size of the video buffer and a resolution of the video; and requesting a lower resolution encoding of the video, wherein the requested video is of a resolution that can be buffered in the video buffer sufficiently long to compensate for the probable transmission time of the audio to the wireless speakers. Also, a lower quality encoding of the audio can be requested. Such lower quality audio will take less time to transmit to the wireless speakers so less buffering of the video will be needed to compensate for transmission delays of the audio.

19 Claims, 5 Drawing Sheets

(51) Int. Cl.
*H04N 7/01* (2006.01)
*H04N 5/60* (2006.01)
*H04R 3/00* (2006.01)

(52) U.S. Cl.
CPC .. *H04N 7/0117* (2013.01); *G11B 2020/10712* (2013.01); *H04R 3/00* (2013.01); *H04R 2420/07* (2013.01)

(56) References Cited

U.S. PATENT DOCUMENTS

| | | | | |
|---|---|---|---|---|
| 2015/0281746 | A1* | 10/2015 | Lam | H04N 21/2368 |
| | | | | 725/116 |
| 2016/0134833 | A1* | 5/2016 | Greene | H04N 21/4307 |
| | | | | 386/207 |
| 2016/0173931 | A1* | 6/2016 | Eber | H04N 21/242 |
| | | | | 725/38 |
| 2016/0255302 | A1* | 9/2016 | Greene | H04N 21/4307 |
| | | | | 381/74 |
| 2016/0286260 | A1* | 9/2016 | Lawrence | H04N 21/4307 |
| 2017/0206906 | A1* | 7/2017 | Jung | G10L 19/005 |
| 2018/0077443 | A1* | 3/2018 | Lau | H04N 5/04 |
| 2018/0098020 | A1* | 4/2018 | Lim | H04N 21/4108 |
| 2018/0124719 | A1* | 5/2018 | Kim | H04L 12/46 |
| 2018/0132011 | A1* | 5/2018 | Shichman | H04N 21/234 |

OTHER PUBLICATIONS

U.S. Appl. No. 16/128,565, filed Sep. 12, 2018, entitled "Adaptive Switching in a Whole Home Entertainment System."

* cited by examiner

DYNAMICALLY ADJUSTING VIDEO TO IMPROVE SYNCHRONIZATION WITH AUDIO

CROSS REFERENCE TO RELATED APPLICATIONS

This application is related to U.S. patent application Ser. No. 16/128,565 titled "Adaptive Switching In a Whole Home Entertainment System," filed herewith, which is herein incorporated by reference in its entirety.

BACKGROUND

Field

This disclosure is generally directed to synchronizing playback of audio and video in a whole home entertainment system having wireless speakers for playing audio associated with content, such as a movie or TV show.

Background

When playing content on a TV, such as a movie or TV show, the playback of audio should be synchronized with the playback of the corresponding video. Otherwise, the user's viewing experience can be greatly diminished.

But, synchronizing audio and video can be a challenge with whole home entertainment systems where audio is wirelessly transmitted to speakers. In such environments, the audio may not be in sync with the video due to the transmission delays caused by the wireless network (or other wireless transmission medium). This technical problem has been exacerbated by the advent of high definition (HD) video (such as 4K and even higher quality video), since it is difficult to buffer such massive amounts of video data to compensate for the delays in audio playback over wireless speakers.

SUMMARY

Provided herein are system, apparatus, article of manufacture, method and/or computer program product embodiments, and/or combinations and sub-combinations thereof, for synchronizing playback of audio and video, wherein the audio is transmitted to wireless speakers over a wireless medium.

Some embodiments operate by receiving content for playback from a source, wherein the content comprises the audio and the video; determining that synchronization of playback of the audio and video will not be acceptable, by analyzing the wireless medium to determine a probable transmission time it will take for the audio to be transmitted to the wireless speakers over the wireless medium; determining that a buffer is not large enough to buffer the video long enough to compensate for the probable transmission time, based on at least a size of the buffer and a resolution of the video; and requesting a lower resolution encoding of the video, wherein the requested video is of a resolution that can be buffered in the buffer sufficiently long to compensate for the probable transmission time of the audio to the wireless speakers.

Also or alternatively, some embodiments operate by generating a lower quality encoding of the audio; and transmitting the lower quality audio to the wireless speakers over the wireless medium.

Also or alternatively, still other embodiments operate by accepting some delay in audio playback as acceptable synchronization of the audio and video, such that requirements of the size of the buffer are relaxed according to the delay, wherein the delay is within a threshold of non-perception of audio by humans.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
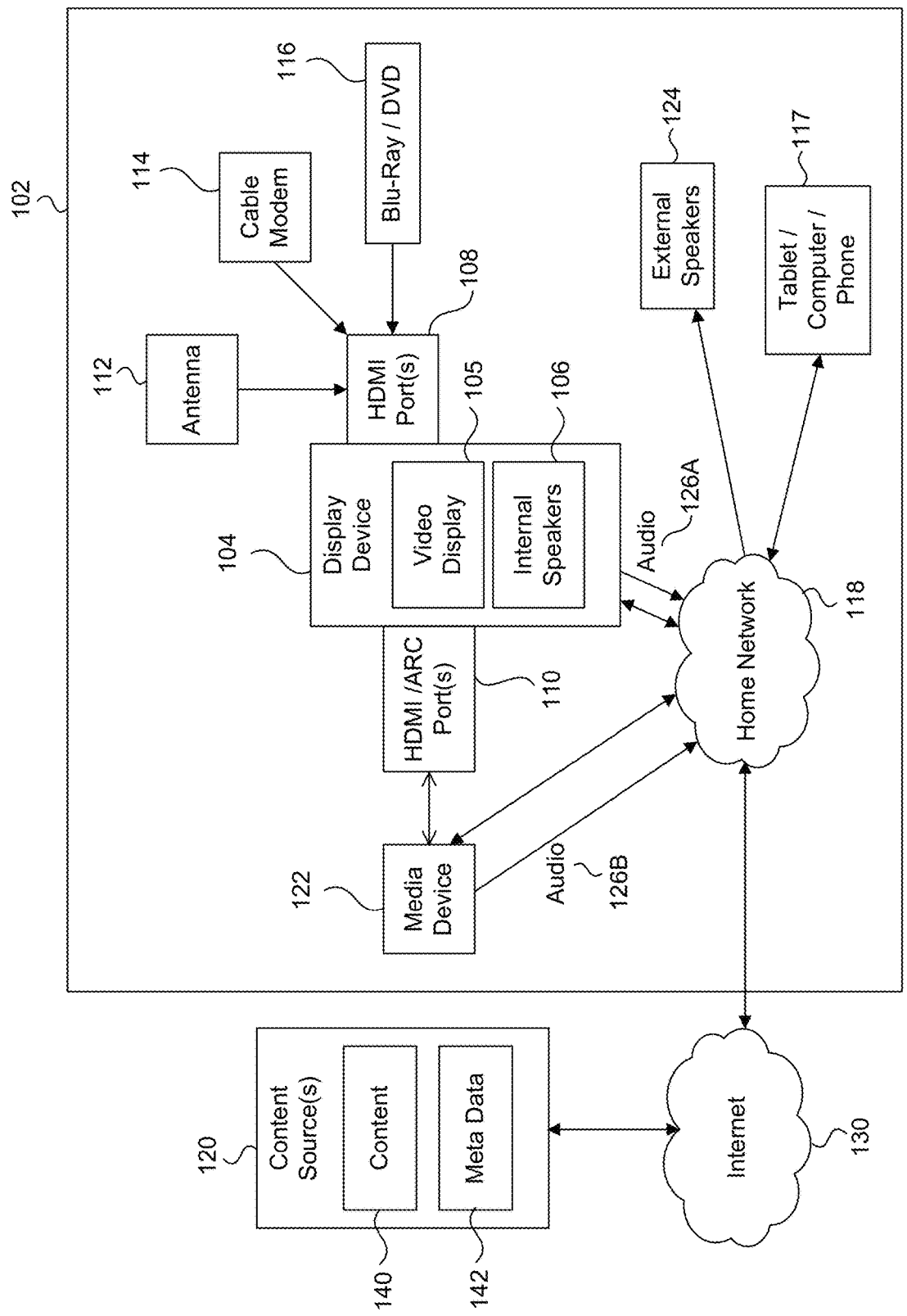
FIG. 1 illustrates a block diagram of a whole home entertainment system, according to some embodiments.

FIG. 1 illustrates a block diagram of a whole home entertainment system 102, according to some embodiments. In a non-limiting example, whole home entertainment system 102 is directed to playing content such as movies, TV shows, games, audio books, and music, to name just some examples. System 102 may be located in a user's home or any other location, such as a business, a park, a stadium, a restaurant, a bar, or a government office, to name just some examples.

Whole home entertainment system 102 includes a display device 104 that includes a video display 105 for displaying video of content, and internal speakers 106 for playing corresponding audio of the content. Display device 104 may be a monitor, television (TV), computer, smart phone, tablet, wearable (such as a watch), appliance, and/or projector, to name just some examples.

The display device 104 may be connected to a media device 122 via an HDMI port 110. In some embodiments, the HDMI port 110 is a HDMI audio return channel (ARC) port, wherein audio playing on the display device 104 is transmitted to the media device 122. Media device 122 may be a streaming media device that may stream content from content sources 120, and may provide such content to the display device 104 for playback to users. For example, media device 122 may communicate via a home (or local) wireless network 118 to stream content from content sources 120 via the Internet 130. Wireless network 118 may be any wireless network, wireless medium or communication protocol such as WIFI, Bluetooth, infrared, cellular, etc., or any combination thereof.

Each content source 120 may store content 140 and metadata 142. Content 140 may include any combination of music, videos, movies, TV programs, multimedia, images, still pictures, text, graphics, gaming applications, advertisements, programming content, public service content, government content, local community content, software, and/or any other content or data objects in electronic form. Metadata 142 may include data about content 140. For example, metadata 142 may include associated or ancillary information indicating or related to writer, director, producer, composer, artist, actor, summary, chapters, production, history, year, trailers, alternate versions, related content, applications, and/or any other information pertaining or relating to the content 140. Metadata 142 may also or alternatively include links to any such information pertaining or relating to the content 140. Metadata 142 may also or alternatively include one or more indexes of content 140, such as but not limited to a trick mode index.

The display device 104 may receive content for playback from any number of other devices, such as an antenna 112 (for over the air broadcasts), cable modem 114 and/or Blu-Ray/DVD 116. These devices may be connected to display device 104 via one or more HDMI ports 108 (any of which may be HDMI/ARC ports), and/or other types of well-known ports such as USB, component, etc.

The display device 104 may also or alternatively wirelessly receive content from devices over the home wireless network 118, such as from tablets, computers and/or phones 117.

The display device 104 may include internal speakers 106, and may play audio associated with content using the internal speakers 106. Additionally or alternatively, display device 104 may play audio using external speakers 124. In some embodiments, external speakers 124 are wireless speakers that wireless communicate with the display device 104 via the home wireless network 118.

Figure 2:
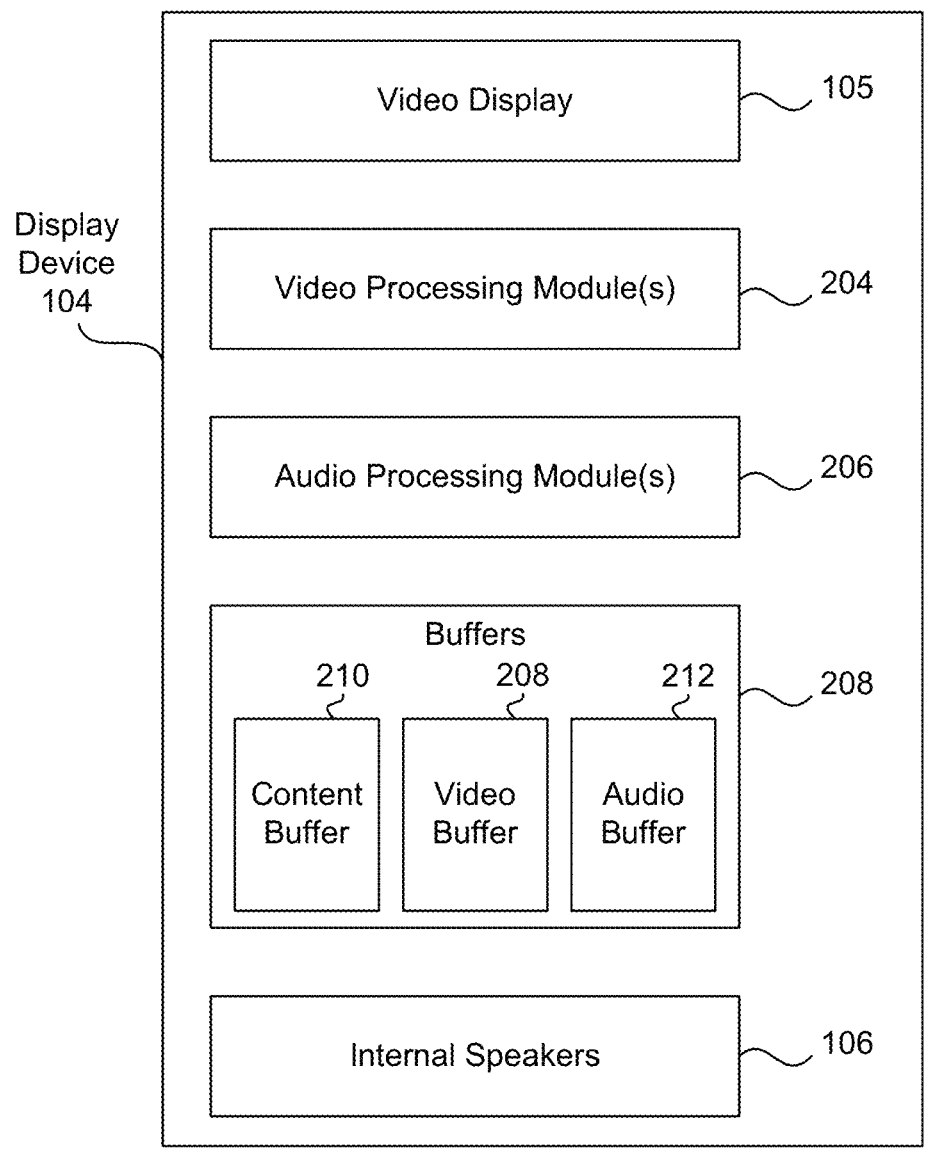
FIG. 2 illustrates a block diagram of a display device, according to some embodiments.

FIG. 2 illustrates the display device 104 in greater detail. In addition to video display 105 and internal speakers 106, display device 104 may include one or more video processing modules 204, and one or more audio processing modules 206.

Each video processing module 204 may be configured to decode, encode and/or translate video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Similarly, each audio processing module 206 may be configured to decode, encode and/or translate audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Display device 208 may also include one or more buffers 207. Buffers 207 may include a video buffer 208, content buffer 210, and/or an audio buffer 212. Content that is received by the display device 104 from an external source may be buffered in the content buffer 210 prior to playback. During playback, the video of that content may be output from the content buffer 210 and buffered in the video buffer 208. Similarly, the audio of the content may be output from the content buffer 210 and buffered in the audio buffer 212.

The size of the video buffer 208 is implementation dependent and may depend on the amount of video that is desired to be stored. For example, to buffer one minute of video at 720p at 30 frames per second (FPS), the video buffer 208 may be at least 60 megabytes (MB). To buffer one minute of video at 1080p at 30 FPS, the video buffer 208 may be at least 130 MB. To buffer one minute of video at 4K at 30 FPS, the video buffer 208 may be at least 375 MB. Similarly, the size of the audio buffer 212 is implementation dependent and may depend on the amount of audio that is desired to be stored.

In some embodiments, the media device 122 may also include video processing modules, audio processing modules and/or buffers. In fact, FIG. 2 may also represent at least part of the structure of the media device 122.

As noted above, the display device 104 may play audio using external speakers 124 by wirelessly transmitting the audio to external speakers 124 via the home wireless network 118. The audio may be transmitted from the display device 104 (shown as audio 126A) or the media device 122 (shown as audio 126B), although audio 126A and 126B are the same when the media device 122 is part of and integrated with the display device 104.

When media device 122 is different from the display device 104, then the media device 122 may receive the audio of the content that is being played on the display device 104 via the audio return functionality of the HDMI ARC port 110. Upon receiving such audio, the media device 122 may transmit the audio to the external speakers 124 via the home wireless network 118. Prior to such transmission, the media device 122 may process the audio using its audio processing modules; this is further described below.

In the whole home entertainment system 102 described above, a technical problem may exist because the external speakers 124 may be delayed in receiving the audio 126 due to latencies, delays and/or other issues related to the home network 118. Such delays may result in the playback of the video on the video display 105 being out of sync with the playback of the audio on the external speakers 124. That is, playback of the audio may lag playback of the video. Such unsynchronized audio and video playback may greatly degrade the user's viewing experience of the content.

In some cases, this technical problem may be addressed by buffering the video at the display device 104 (using video buffer 208) and/or the media device 122 prior to playback on the video display 105. By doing so, playback of the video can be delayed by an amount equal to the transmission delay caused by the home wireless network 118, to thereby synchronize the audio with the video. But, this approach may not be possible with high definition video such as 1080p and 4K. Because such HD video is composed of a large amount of data, the video buffer 208 may not be large enough to store enough video to compensate for the transmission delay caused by the home wireless network 118.

Figure 3:
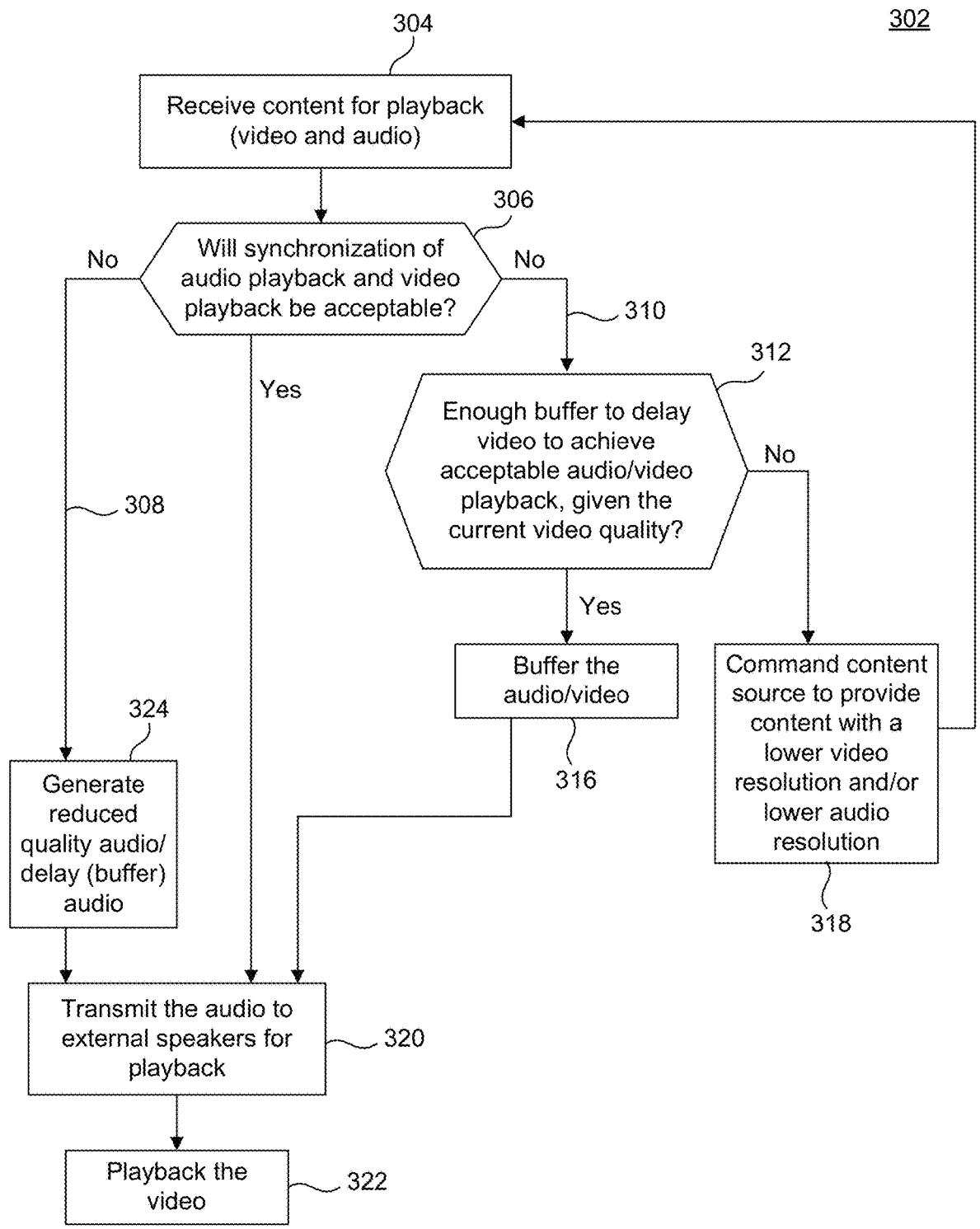
FIG. 3 illustrates a flowchart for synchronizing audio and video in a whole home entertainment system having wireless speakers for playing audio associated with content, such as a movie or TV show, according to some embodiments.

Embodiments of this disclosure employ various techniques to address and solve this technical problem. For example, some embodiments dynamically adjust the resolution of the video being received (from antenna 112, cable modem 114, Blu-Ray/DVD 116, tablet/computer/phone 117, content sources 120, etc.) based on the size of the video buffer 208 and/or the current condition of the home wireless network 118. In particular, some embodiments request a lower resolution encoding of the video (such as, for example, 1080p or 720p rather than 4K) based on the size of the video buffer 208 and/or the current condition of the home wireless network 118. Such operation is depicted in FIG. 3 which shows a flowchart 302 for synchronizing audio and video in a whole home entertainment system, according to some embodiments.

Method 302 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 302 shall be described with reference to FIGS. 1 and 2. However, method 302 is not limited to those example embodiments.

In 304, the display device 104 may receive content for playback. The content may be a movie or TV show, for example, and may include both video and audio. The content may be received from any source that is directly or indirectly connected or otherwise accessible to display device 104, such as antenna 112, cable modem 114, Blu-Ray/DVD 116, tablet/computer/phone 117, content sources 120, etc. The content may be received directly by display device 104 or via media device 122, either wired or wirelessly. In fact, in some embodiments, the media device 122 may perform the operations of flowchart 302, rather than the display device 104.

In the example of flowchart 302, it is assumed that video of the content will be played on the video display 105 of the display device 104, and the corresponding audio of the content will be transmitted over the home wireless network 118 to the external speakers 124 for playback. Accordingly, in 306, the display device 104 may determine whether the audio and video will be synchronized when played at the external speakers 124 and the video display 105, respectively. To perform step 306, the display device 104 may analyze the current state and condition of the home wireless network 118, to determine the probable transmission time it will take for the audio to be transmitted to the external speakers 124 over the home wireless network 118. To perform this analysis and determination, the display device 104 may use any well-known techniques, algorithms, services, tools, modules and/or approaches for evaluating the state and condition of a wireless medium, and may take into consideration factors such as bandwidth, traffic, blocking, collisions, latency, utilization, signal strength, the number of devices on a given channel, etc., as well as historical statistics of any of the foregoing, to name just some examples.

Then, the display device 104 in step 306 may determine whether playback of the audio and the video will be synchronized in an acceptable manner given the probable transmission time of the audio from the display device 104 to the external speakers 124 over the home wireless network 130. Audio that is out of sync with video by a small amount (such as 50-100 milliseconds) is not perceivable by most humans. See, for example, "Relative Timing Of Sound And Vision For Broadcasting" (ITU-R BT.1359, 1998).

Thus, if the probable transmission time is less than 50-100 milliseconds (or some other predetermined threshold), then the display device 104 may proceed with transmitting the audio to the external speakers 124 over the home wireless network 118 for playback (step 320), and also begin playing the video on the video display 105 (step 322) (it is noted that steps 320 and 322 may be performed in parallel, rather than serially as shown in the example of FIG. 3).

But, if it is determined in step 306 that the probable transmission time is greater than 50-100 milliseconds (or some other predetermined threshold)—that is, if it is determined in step 306 that synchronization of audio and video playback will not be acceptable—then either step 312 or 324 may be performed (in some embodiments, both steps 312 and 324 are performed).

We shall first consider step 312, wherein the display device 104 may determine if the video buffer 208 is large enough to buffer the video (that was received in step 304) for the time needed to transmit the audio from the display device 104 to the external speakers 124 over the home wireless network 118 (that is, for a time equal to the probable transmission time). This determination is a function of both the size of the video buffer 208 and the resolution (or quality, bit rate, etc.) of the video, since it takes more memory to store a minute (or other time increment) of higher resolution video compared to lower resolution video (such as 4K versus 1080p, or 1080p versus 720p). This determination may also take into consideration other factors, such as the possibility of using a lower quality version of the audio. Such lower quality audio would take less time to transmit to the external speakers 124, and thus the time needed to buffer the video in the video buffer 208 would be reduced.

If it is determined that the video buffer 208 is sufficiently large to buffer the video received in step 304, then in step 316, the display device 104 may buffer the video in the video buffer 208. Such buffering acts to delay playback of the video on the video display 105, to thereby compensate for the transmission delay of the audio caused by the home wireless network 118. Also or alternatively, the video can be compressed to reduce the amount of data that must be stored in the video buffer 208. The audio may also be compressed to reduce the amount of audio data that must be sent to the external speakers 124 over the home network 118. Such compression can be performed by video processing module(s) 204 and/or audio processing module(s) 206 and may involve hardware acceleration. As will be appreciated by persons skilled in the relevant art(s), the audio may also be buffered in the audio buffer 212 prior to transmission to the external speakers 124 via the home network 118.

In step 320, the display device 104 may transmit the audio (from the audio buffer 212) to the external speakers 124 over the home wireless network 118 for playback. In step 322, after buffering the video in the video buffer 208 for a time equal to, or substantially equal to, the probable transmission time of the audio (as determined in step 312), the display device 104 may begin playing the video on the video display 105.

Figure 4:
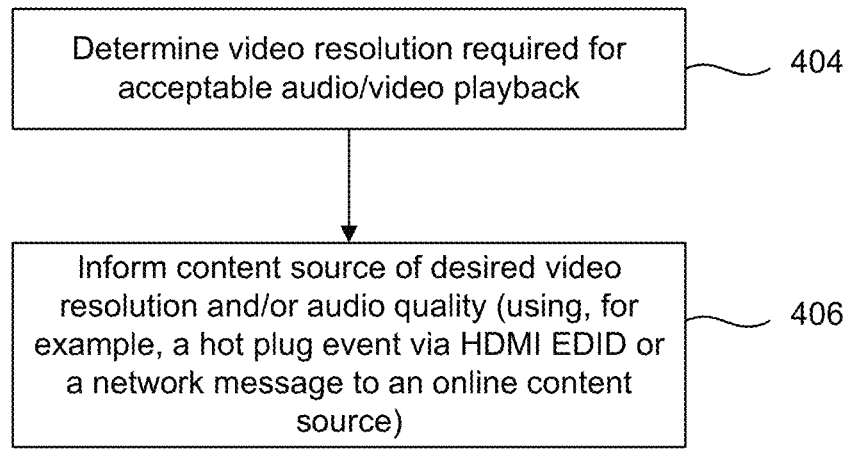
FIG. 4 illustrates a flowchart for determining video resolution to enable the synchronization of audio and video in a whole home entertainment system, according to some embodiments.

Returning to step 312, if it is determined that the video buffer 208 is not sufficiently large to buffer the video that was received in step 304, then step 318 is performed. In step 318, the display device 104 may request a different bitrate or lower resolution encoding of the video. (Alternatively, in some embodiments, the display device 104 may use its video processing module(s) 204 to generate a lower bit-rate encoding of the video. The media device 122 could also or alternatively perform this function.) Also or alternatively, the display device 104 may request a lower quality version of the audio (because, as noted above, lower quality audio comprises less data and will take less time to transmit to the external speakers). FIG. 4 illustrates a flowchart 402 for performing step 318, in some embodiments.

In 404, the display device 104 may determine the video resolution required to achieve satisfactory buffering, given the size of the video buffer 208 and the probable transmission time of the audio. For example, if the probable transmission time is 250 milliseconds, then the display device 104 may determine and identify an encoding of the video having a resolution that can be buffered in the video buffer 208 (given the size of the video buffer 208) for 250 milliseconds (it is noted that this determination may take into consideration other factors, such as the frames per second of the video). As noted above, a relatively higher resolution encoding of the video can be requested, if the video is compressed prior to buffering in the video buffer 208. Also or alternatively, a relatively higher resolution encoding of the video can be requested if a lower resolution version of the audio is being requested in step 318 (since less time will be needed to transmit such lower quality audio to the external speakers 124).

In 406, the display device 104 may request this encoding of the video (that was identified in step 404) from the source that is currently providing the content. For example, if the content is being provided by an online content source 120 over the internet 130, then the display device 104 may transmit a message over the internet 130 to request the content source 120 to provide the encoding of the video determined in step 404. The message may be an HTTP request, for example. In another example, if the content is being provided from Blu-Ray/DVD 116 or another device via HDMI port 108, then the display device 104 may initiate a hot plug event via the well-known HDMI EDID (extended display identification data) protocol to command the Blu-Ray/DVD 116 to provide the encoding of the video determined in step 404. In a similar manner, lower quality audio can also be requested. HTTP requests, hot plug events and HDMI EDID are well known to persons skilled in the relevant arts.

Referring again to FIG. 3, control returns to step 304 after step 318. In step 304, the display device 304 receives the content with the lower resolution video and/or lower quality audio requested in step 318.

Other embodiments use alternative or additional approaches for synchronizing audio and video playback, when audio is transmitted over a wireless network for playback on wireless speakers. For example, referring again to step 306, if it is determined that synchronization of audio and video playback is not acceptable, then step 324 may be performed. Step 324 may be performed instead of, or in addition to, step 312.

In step 324, the audio processing module 206 in the display device 104 (or media device 122) may generate a lower quality encoding of the audio. Such lower quality audio will be smaller in size and, thus, take less time to transmit to the external speakers 124 over the home wireless network 118. Also or alternatively, as noted above, a lower resolution version of the audio may be requested from the content source (see step 318). Either approach may enable the video to be buffered in the video buffer 208 to achieve satisfactory audio/video playback synchronization, without having to request a lower resolution encoding of the video in step 318. Or, it may still be necessary to request a lower resolution video, but the video encoding requested in step 318 may be higher in quality than would otherwise be possible without reducing the audio quality in step 324.

Also or alternatively in step 324, the display device 104 may intentionally accept some amount of delay in the audio. As noted above, audio that is out of sync with video by a small amount (such as 50-100 milliseconds) is not perceivable by most humans. By accepting some amount of audio delay within this threshold of non-perception, the size requirements of the video buffer 208 can be relaxed. That is, the video buffer 208 would no longer have to be sufficient to buffer video to achieve complete synchronization of audio and video playback; rather, the video buffer 208 would need only buffer enough video to achieve a delay in the audio playback of less than the threshold of non-perception. In some embodiments, however, the audio delay should be constant, as variation of delay (even delay of 100 milliseconds or shorter) may be perceivable by humans.

As will be appreciated by persons skilled in the relevant art(s), the lower quality encoding of the audio may be buffered in the audio buffer 212 prior to transmission to the external speakers 124 via the home network 118. Steps 320 and 322 are then performed as described above.

Example Computer System

Figure 5:
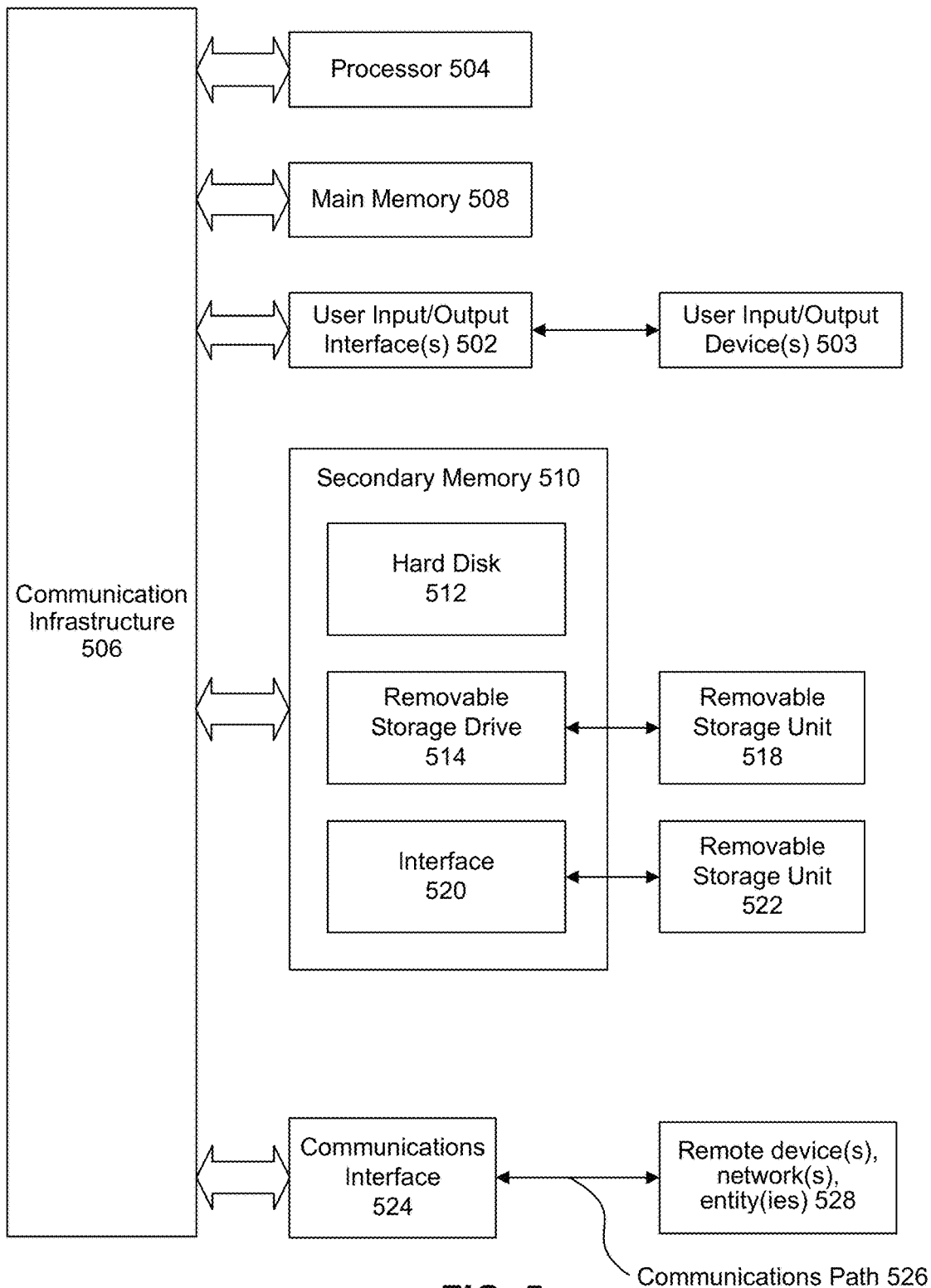
FIG. 5 illustrates an example computer system useful for implementing various embodiments.

Various embodiments and/or components therein can be implemented, for example, using one or more computer systems, such as computer system 500 shown in FIG. 5. Computer system 500 can be any computer or computing device capable of performing the functions described herein. For example, one or more computer systems 500 or portions thereof can be used to implement any embodiments of FIGS. 1-4, and/or any combination or sub-combination thereof.

Computer system 500 includes one or more processors (also called central processing units, or CPUs), such as a processor 504. Processor 504 is connected to a communication infrastructure or bus 506.

One or more processors 504 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 can include other means, instrumentalities or other approaches for allowing computer programs and/or other instructions and/or data to be accessed by computer system 500. Such means, instrumentalities or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

Conclusion

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. An electronic device, comprising:
one or more video processing modules;
one or more audio processing modules;
a plurality of buffers, including a video buffer; and
at least one processor configured to:
receive content for playback from a source, wherein the content comprises audio and the video;
determine that synchronization of playback of the audio and video will not be within an acceptable range, by at least analyzing a wireless medium to determine a probable transmission time it will take for the audio to be transmitted to wireless speakers over the wireless medium;
determine a variance that indicates that the video buffer is not large enough to buffer the video long enough to compensate for the probable transmission time, based on at least a size of the video buffer and a resolution of the video;
determine a first resolution of video is required to reduce the variance into the acceptable range based on a first measure of a quality of the audio;
determine a second resolution of video that is required to reduce the variance into the acceptable range based on a second measure of the quality of the audio;
select the second resolution of the video and the second measure of the quality of the audio based on a determination that the second resolution is greater than the first resolution;
request a lower quality audio that reduces the variance in accordance with the second measure; and
request a lower resolution encoding of the video, in accordance with the second resolution, in addition to the requested lower quality audio, that further reduces the variance to fall within the acceptable range, wherein the requested video is of a resolution that can be buffered in the video buffer sufficiently long to compensate for the probable transmission time of the audio to the wireless speakers.

2. The electronic device of claim 1, wherein to request, the at least one processor is further configured to:

determine a resolution of the video to achieve acceptable synchronization of the audio and the video, based on at least the size of the video buffer and the probable transmission time; and request the source to provide the lower resolution encoding of the video having the determined resolution.

3. The electronic device of claim 1, wherein to request, the at least one processor is further configured to:

initiate a hot plug event via HDMI extended display identification data (EDID) when the source is a device connected via a HDMI port; or transmit an HTTP message when the source is an online source.

4. The electronic device of claim 1, wherein the at least one processor is further configured to:

generate a lower quality encoding of the audio; and transmit the lower quality audio to the wireless speakers over the wireless medium.

5. The electronic device of claim 1, wherein the at least one processor is further configured to:

accept some delay in audio playback as acceptable synchronization of the audio and video, such that requirements of the size of the video buffer are relaxed according to the delay, wherein the delay is within a threshold of non-perception of audio by humans.

6. A method for synchronizing playback of audio and video, wherein the audio is transmitted to wireless speakers over a wireless medium, the method comprising:

receiving content for playback from a source, wherein the content comprises audio and the video;

determining that synchronization of playback of the audio and video will not be within an acceptable range, by analyzing a wireless medium to determine a probable transmission time it will take for the audio to be transmitted to wireless speakers over the wireless medium;

determining a variance that indicates that a video buffer is not large enough to buffer the video long enough to compensate for the probable transmission time, based on at least a size of the video buffer and a resolution of the video;

determining a first resolution of video is required to reduce the variance into the acceptable range based on a first measure of a quality of the audio;

determining a second resolution of video that is required to reduce the variance into the acceptable range based on a second measure of the quality of the audio;

selecting the second resolution of the video and the second measure of the quality of the audio based on a determination that the second resolution is greater than the first resolution;

requesting a lower quality audio that reduces the variance in accordance with the second measure; and requesting a lower resolution encoding of the video in accordance with the second resolution, in addition to the requested lower quality audio, that further reduces the variance to fall within the acceptable range, wherein the requested video is of a resolution that can be buffered in the video buffer sufficiently long to compensate for the probable transmission time of the audio to the wireless speakers.

7. The method of claim 6, wherein the requesting comprises:

determining a resolution of the video to achieve acceptable synchronization of the audio and the video, based on at least the size of the video buffer and the probable transmission time; and requesting the source to provide the lower resolution encoding of the video having the determined resolution.

8. The method of claim 6, wherein the requesting comprises initiating a hot plug event via HDMI extended display identification data (EDID) when the source is a device connected via a HDMI port, or transmitting an HTTP message when the source is an online source.

9. The method of claim 6, further comprising:

generating a lower quality encoding of the audio; and transmitting the lower quality audio to the wireless speakers over the wireless medium.

10. The method of claim 6, further comprising:

accepting some delay in audio playback as acceptable synchronization of the audio and video, such that requirements of the size of the video buffer are relaxed according to the delay, wherein the delay is within a threshold of non-perception of audio by humans.

11. A non-transitory computer-readable device having instructions stored thereon that, when executed by at least one computing device, cause the at least one computing device to perform operations comprising:

receiving content for playback from a source, wherein the content comprises audio and the video;

determining that synchronization of playback of the audio and video will not be within an acceptable range, by analyzing a wireless medium to determine a probable transmission time it will take for the audio to be transmitted to wireless speakers over the wireless medium;

determining a variance that indicates that a video buffer is not large enough to buffer the video long enough to compensate for the probable transmission time, based on at least a size of the video buffer and a resolution of the video;

determining a first resolution of video is required to reduce the variance into the acceptable range based on a first measure of a quality of the audio;

determining a second resolution of video that is required to reduce the variance into the acceptable range based on a second measure of the quality of the audio;

selecting the second resolution of the video and the second measure of the quality of the audio based on a determination that the second resolution is greater than the first resolution;

requesting a lower quality audio that reduces the variance in accordance with the second measure; and requesting a lower resolution encoding of the video in accordance with the second resolution, in addition to the requested lower quality audio, that further reduces the variance to fall within the acceptable range, wherein the requested video is of a resolution that can be buffered in the video buffer sufficiently long to compensate for the probable transmission time of the audio to the wireless speakers.

12. The computer-readable device of claim 11, wherein the requesting comprises:

determining a resolution of the video to achieve acceptable synchronization of the audio and the video, based on at least the size of the video buffer and the probable transmission time; and requesting the source to provide the lower resolution encoding of the video having the determined resolution.

13. The computer-readable device of claim 11, wherein the requesting comprises initiating a hot plug event via HDMI extended display identification data (EDID) when the source is a device connected via a HDMI port, or transmitting an HTTP message when the source is an online source.

14. The computer-readable device of claim 11, the operations further comprising:
  generating a lower quality encoding of the audio; and
  transmitting the lower quality audio to the wireless speakers over the wireless medium.

15. The computer-readable device of claim 11, the operations further comprising:
  accepting some delay in audio playback as acceptable synchronization of the audio and video, such that requirements of the size of the video buffer are relaxed according to the delay, wherein the delay is within a threshold of non-perception of audio by humans.

16. The method of claim 1 wherein the requesting a lower resolution comprises requesting a lower bit-rate encoding of the video.

17. The method of claim 16 wherein the requesting a lower resolution further comprises requesting a lower resolution of the audio.

18. The method of claim 1, wherein the audio is transmit to both internal and external speakers, and wherein the probable transmission time is measured relative to the external speakers.

19. The method of claim 1, further comprising:
  receiving a lower encoded audio responsive to the request for the lower quality audio.

* * * * *